United States Patent [19]

Kondou

[11] Patent Number: 4,466,664
[45] Date of Patent: Aug. 21, 1984

[54] SEAT WITH A RECLINING BACK AND AN ARMREST

[75] Inventor: Nobuaki Kondou, Yokohama, Japan

[73] Assignee: Nissan Motor Company, Limted, Yokohama, Japan

[21] Appl. No.: 352,895

[22] Filed: Feb. 26, 1982

[30] Foreign Application Priority Data

Mar. 26, 1981 [JP] Japan .................................. 56-44479

[51] Int. Cl.³ .............................................. A47C 7/54
[52] U.S. Cl. .................................... 297/411; 248/291; 297/417
[58] Field of Search ................ 297/417, 411; 403/104, 403/108, 164, 97, 93, 96; 248/299, 291, 294, 397

[56] References Cited

U.S. PATENT DOCUMENTS

| 4,165,901 | 8/1979 | Swenson | 297/417 |
| 4,196,821 | 4/1980 | Teti, Jr. et al. | 248/291 |
| 4,244,623 | 1/1981 | Hall et al. | 297/417 |
| 4,307,913 | 12/1981 | Spiegelhoff | 297/417 |

FOREIGN PATENT DOCUMENTS

| 2932347 | 2/1981 | Fed. Rep. of Germany | 297/417 |
| 1256977 | 12/1971 | United Kingdom | 297/417 |
| 1321193 | 6/1973 | United Kingdom | |

Primary Examiner—James T. McCall
Attorney, Agent, or Firm—Schwartz, Jeffery, Schwaab, Mack, Blumenthal & Koch

[57] ABSTRACT

A seat has a reclining back and an armrest which is connected to the seat back in such a manner as to be changeable in angular position with respect to the seat back. A locking device releasably fastens the armrest to the seat back in such a manner as to fix the armrest in any one of more than two preset angular positions with respect to the seat back.

6 Claims, 4 Drawing Figures

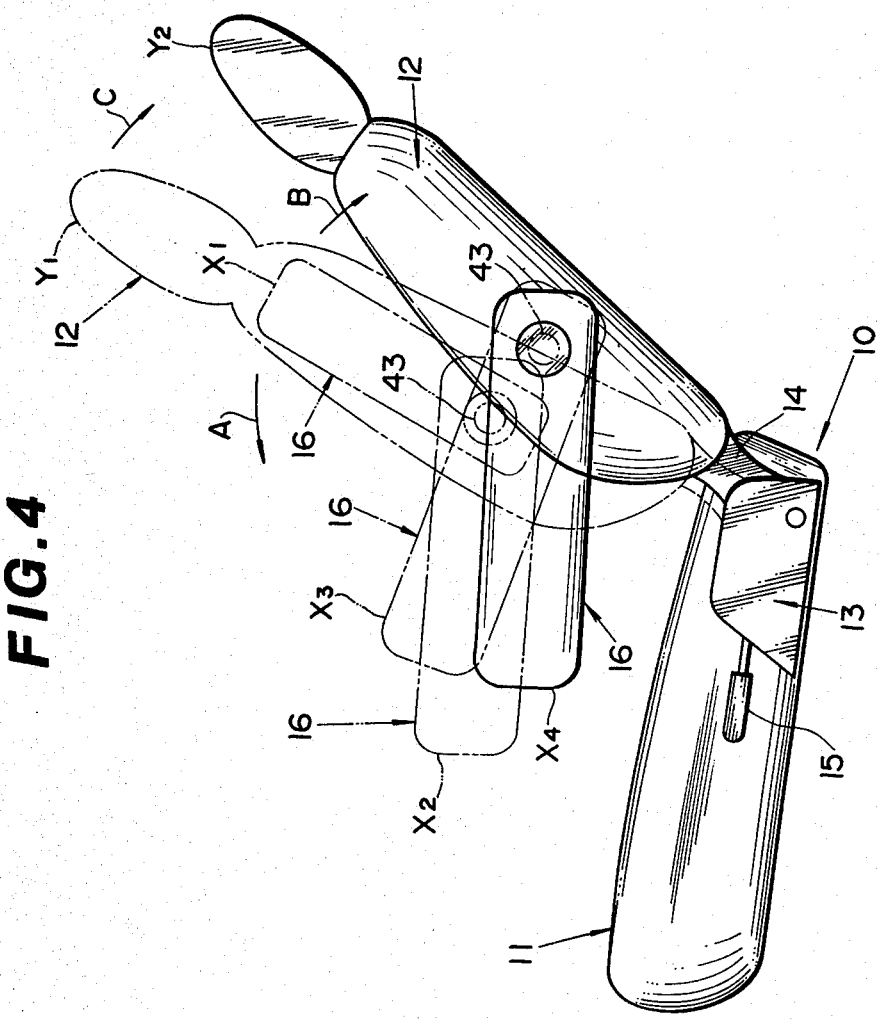

SEAT WITH A RECLINING BACK AND AN ARMREST

BACKGROUND OF THE INVENTION

1. Field of the Invention

This invention relates to a seat with a reclining back and an armrest used as furniture or used for a conveyance, such as a motor car, ship, or aircraft.

2. Description of the Prior Art

Some kinds of automotive vehicles are equipped with seats with reclining backs and armrests which can take either of two positions, retracted or operating position. Since the operating position of the armrest is at a fixed angular position with respect to the seat back and is so set as to be suitable to the normal position of the seat back, such an armrest sometimes becomes uncomfortable when the seat back is tilted backwards from the normal position.

SUMMARY OF THE INVENTION

Accordingly, it is an object of the present invention to provide a seat with a reclining back and an armrest which is comfortable regardless of the tilt position of the seat back.

In accordance with the present invention, a seat has a reclining back and an armrest, which is connected to the seat back in such a manner as to be changeable in angular position with respect to the seat back. A locking device releasably fastens the armrest to the seat back in such a manner as to fix the armrest in any one of more than two preset angular positions with respect to the seat back.

The above and other objects, features and advantages of the present invention will be apparent from the following description of a preferred embodiment thereof, taken in conjunction with the drawings.

BRIEF DESCRIPTION OF THE DRAWINGS

FIG. 4 is a side elevational view of the seat shown in FIG. 1.

DESCRIPTION OF THE PREFERRED EMBODIMENT

Figure 1:
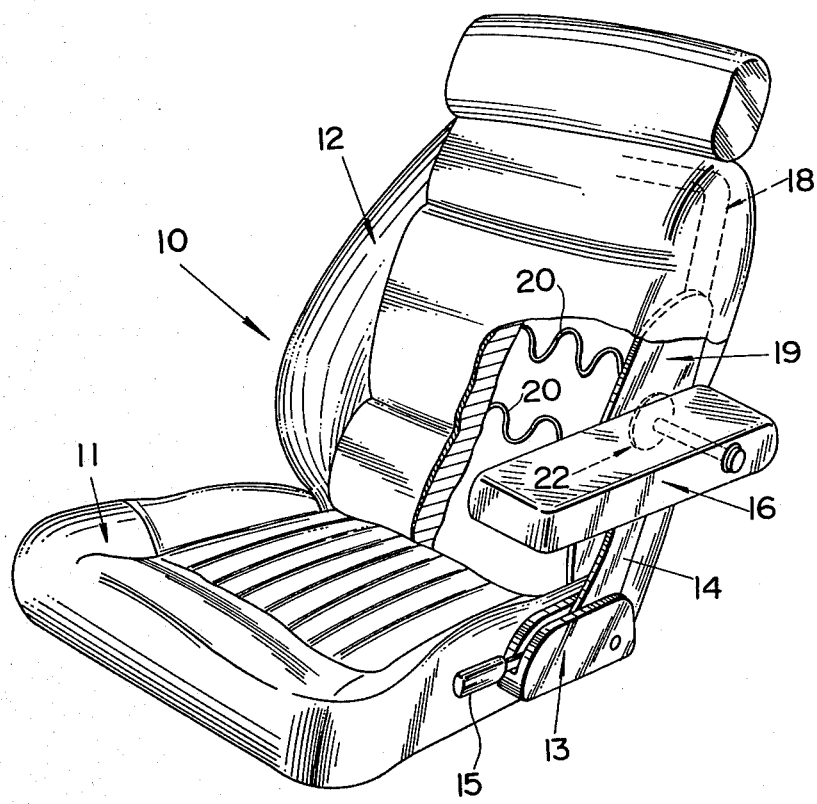
FIG. 1 is a partially cut-away perspective view of a seat with a reclining back and an armrest of the present invention.

With reference to the drawings and especially to FIG. 1, there is shown a seat 10 of the present invention which has a seat cushion 11 and seat back 12. The seat back 12 is rotatably attached to the seat cushion 11 by means of a conventional reclining device 13 in such a manner as to be releasably locked in any one of preset angular positions. The reclining device 13 has a rotatable arm 14 connected to the seat back 12. The reclining device 13 also has a reclining lever 15 which can be actuated to allow a change in angular position of the seat back 12 with respect to the seat cushion 11.

An armrest 16 is attached to the side of the seat back 12 in such a manner as to be rotatable, with respect to the seat back 12, in a plane perpendicular to the transverse direction of the seat 10. The armrest 16 extends in a plane perpendicular to the transverse direction of the seat back 12 and is of substantially rectangular cross-section. The armrest 16 can be releasably locked in any one of a plurality of preset angular positions by means of a locking device 22. The number of selectable angular positions of the armrest 16 is chosen to be more than two so that the armrest 16 can assume a comfortable angle regardless of the angular position of the seat back 12 with respect to the seat cushion 11.

The seat back 12 includes a frame 18, a pair of side brackets 19, only one of which is shown, and a plurality of springs 20. The side bracket 19 is fixed to the frame 18. The side bracket 19 is in the form of a plate extending along the side of the seat back 12 and lying in a plane perpendicular to the transverse direction of the seat back 12. The springs 20 extend transversely from the side bracket 19 to the other side bracket.

Figure 2:
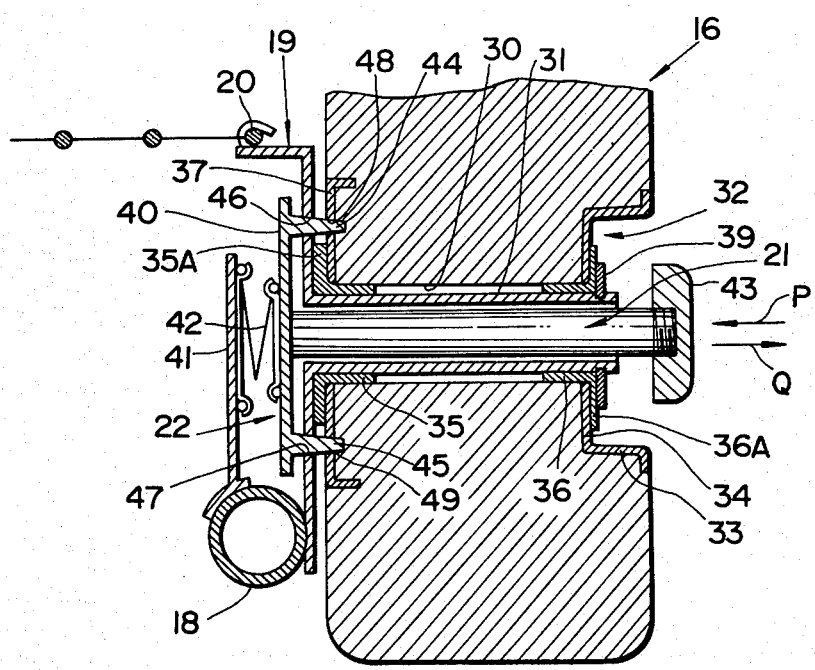
FIG. 2 is a cross-sectional view of the armrest, locking device shown in FIG. 1.
Figure 3:
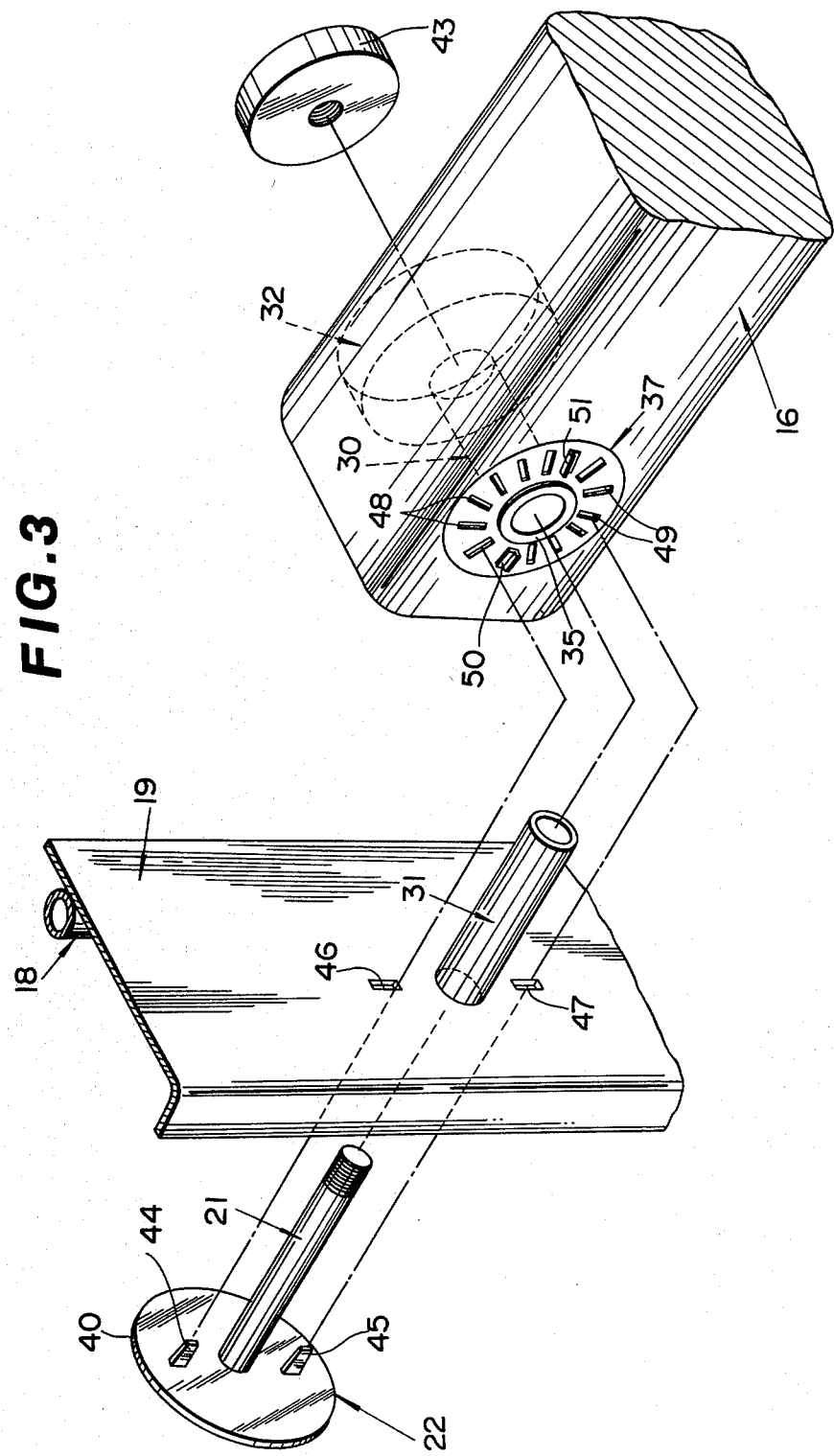
FIG. 3 is an exploded view in perspective of the armrest, side bracket, and locking device shown in FIG. 2.

As shown in FIGS. 2 and 3, the armrest 16 is provided with a hole 30 of circular cross-section which runs from one side surface to the opposite side surface of the armrest 16. The side bracket 19 is provided integrally with a sleeve 31 which extends perpendicularly from the main portion of the side bracket 19 and protrudes from the side of the seat back 12 in the transverse direction with respect to the seat back 12. The outside diameter of the sleeve 31 is smaller than the inside diameter of the hole 30 so as to be insertable into the hole 30 with a predetermined clearance preserved between the armrest 16 and the sleeve 31. Thus, the armrest 16 is permitted to rotate about the sleeve 31. A pair of bushings 35 and 36 are provided between the armrest 16 and the sleeve 31 at opposite ends of the hole 30 to ensure smooth rotation of the armrest 16 about the sleeve 31.

The locking device 22 includes a shaft 21, the outside diameter of which is slightly smaller than the inside diameter of the sleeve 31 so as to coaxially extend through the sleeve 31 in an axially slideable or movable manner. The shaft 21 is longer than the sleeve 31 so that both ends of the shaft 21 will protrude from the sleeve 31.

The side of the armrest 16 remote from the side bracket 19 is provided with a recess 32 of circular cross-section, the inside diameter of which is larger than that of the hole 30. The recess 32 is coaxial with the hole 30, the end of which opens to the recess 32. The sleeve 31 is of such length as to terminate within the recess 32 when it is fully inserted through the hole 30 to be located in place. The surfaces of the armrest 16 defining the recess 32 are covered with a finishing member 33, which has an end wall 34 covering the bottom of the recess 32. The end wall 34 is provided with a circular aperture, which is of same inside diameter as that of the hole 30 and is coaxial with the hole 30 to accommodate the sleeve 31.

The bushing 35 near the side bracket 19 has a radially-extending flange 35A which is sandwiched between the side bracket 19 and a circular plate 37 attached firmly to the side surface of the armrest 16 facing the side bracket 19. The plate 37 is provided with a central circular aperture, which is of same inside diameter as that of the hole 30 and is coaxial with the hole 30 to accommodate the bushing 35 and the sleeve 31. The bushing 36 remote from the side bracket 19 passes through the end wall 34 aperture of the finishing member 33 and has a radially-extending flange 36A in contact with the end wall 34. In the recess 32, a radially-extending snap ring 39 is fitted to the end of sleeve 31 and abuts on the flange 36A so as to prevent the armrest 16 from falling off of the sleeve 31. That is, the snap ring 39 limits the movement of the armrest 16 along the axis of the sleeve 31.

The locking device 22 includes a circular lock plate 40 which is mounted coaxially on the end of the shaft 21 protruding from the base end of the sleeve 31 and thus from the side bracket 19. The lock plate 40 is preferably formed integrally with the shaft 21. A spring bracket 41 is secured to the frame 18. A return spring 42 is provided between the spring bracket 41 and the lock plate 40 so as to urge the lock plate 40 and the shaft 21 in the outward transverse direction with respect to the seat back 12, that is, the direction indicated by the letter Q of FIG. 2. A disc-shaped button 43 is coaxially screwed onto the other end of the shaft 21 protruding from the distal end of the sleeve 31. When the button 43 is pushed in the inward transverse direction with respect to the seat back 12, that is, the direction indicated by the letter P of FIG. 2, the lock plate 40 and the shaft 21 are axially moved against the force of the spring 42. The inside diameter of the recess 32 is larger than the outside diameter of the button 43 so as to accommodate the latter when it is moved in the inwardly transverse direction.

The lock plate 40 has a pair of wedge-shaped tabs 44 and 45 of rectangular cross-section, which protrude from the surface of the plate 40 facing the side bracket 19. The tabs 44 and 45 extend in the axial direction with respect to the shaft 21, and are diametrically opposed to each other around the shaft 21. The tabs 44 and 45 also extend in the radial direction with respect to the shaft 21. The side bracket 19 has a pair of holes 46 and 47 of a rectangular cross-section, which are also diametrically opposed to each other around the sleeve 31. The holes 46 and 47 coincide with the tabs 44 and 45 so as to snugly accommodate the tabs 44 and 45 respectively. Thus, the lock plate 40 can engage the side bracket 19 by means of the tabs 44 and 45. The tabs 44 and 45 are normally inserted and held in the corresponding holes 46 and 47 by the force of the spring 42. The tabs 44 and 45 are of such length as to normally protrude through the side bracket 19 to engage the plate 37 on the side surface of the armrest 16 facing the side bracket 19. When the lock plate 40 is moved against the force of the spring 42 in the direction P of FIG. 2, the tabs 44 and 45 disengage from the plate 37.

The plate 37 is provided with a plurality of pairs of radially-extending slots 48 and 49 diametrically opposing one another around the central aperture through the plate 37. The distance between the slots 48 and 49 of each pair corresponds to the distance between the tabs 44 and 45. The slots 48 and 49 of each pair are of such shape as to snugly accommodate the ends of the tabs 44 and 45. The tabs 44 and 45 are normally held in one of the pairs of slots 48 and 49 by the spring 42 to securely fasten the armrest 16 to the side bracket 19. When the lock plate 40 is moved against the force of the spring 42 in the direction P of FIG. 2, the tabs 44 and 45 are separated from the plate 37 to release the armrest 16 from the side bracket 19. Each of the slot pairs in the plate 37 corresponds to one of the selectable angular positions of the armrest 16. The number of the slot pairs, that is, of the selectable angular positions of the armrest 16, is chosen to be more than two, for example, six in the embodiment shown in FIG. 3. The angular distance between the slot pairs corresponds to that between the selectable positions of the armrest 16. These slot pairs are preferably arranged in an evenly-spaced angular relationship so as to provide even spacing between the angular positions of the armrest 16. The slot pairs are preferably designed so that the selectable angular positions of the armrest 16 with respect to the seat back 12 will include a retracted position where the armrest 16 is adjacent and parallel to the side of the seat back 12.

The armrest 16 is provided with grooves at positions directly facing the slots 48 and 49. These grooves are thus aligned with the respective slots 48 and 49. The tabs 44 and 45 are of such length that the distal ends of the tabs will normally protrude through the plate 37 and be accommodated in the grooves in the armrest 16.

The plate 37 is also provided with a pair of radially-extending stoppers 50 and 51 which are diametrically opposed to each other around the central aperture through the plate 37. The distance between the stoppers 50 and 51 corresponds to the distance between the tabs 44 and 45. The stoppers 50 and 51 protrude from the plate 37 toward the side bracket 19 so that they can engage the tabs 44 and 45 to limit the rotation of the armrest 16 about the sleeve 31.

The operation of the seat 10 with the reclining back 12 and armrest 16 will now be described for a case where the angular range of the armrest 16 is chosen to be 180° starting from the retracted position $X_1$ to the angularly opposite position along the direction designated by the arrow A of FIG. 4. When the seat back 12 is in the normal position $Y_1$ and the armrest 16 is in the retracted position $X_1$ as shown in FIG. 4, the tabs 44 and 45 are placed in the slots 48 and 49 nearest the stoppers 50 and 51.

To use the armrest 16, firstly the button 43 is pushed against the spring 42 to move the shaft 21 and the lock plate 40 in the direction P of FIG. 2. The movement of the lock plate 40 causes the tabs 44 and 45 to come out of the slots 48 and 49, thereby releasing the armrest 16 from the side bracket 19. At that time, the tabs 44 and 45 can engage the stoppers 50 and 51 to prevent the rotation of the armrest 16 in the direction of the arrow B of FIG. 4.

Secondly, the armrest 16 is rotated in the direction A while the button 43 is kept depressed. When the armrest 16 reaches the desired position, such as is designated by $X_2$ of FIG. 4, thirdly the button 43 is released. Then, the lock plate 40 and the shaft 21 move in the direction Q of FIG. 2 due to the force of the spring 42, so that the tabs 44 and 45 enter the slots 48 and 49 nearest thereto. Thus, the tabs 44 and 45 fasten the armrest 16 to the side bracket 19 and fix the armrest 16 in a position essentially equal to the desired position $X_2$ of FIG. 4.

As the seat back 12 is reclined from the position $Y_1$ to the position $Y_2$ along the direction C of FIG. 4, the armrest 16 also moves, for example, from the position $X_2$ to the position $X_3$, as shown in FIG. 4. Since the desired position of the armrest 16 usually changes according to the rotation of the seat back 12, the position $X_3$ of FIG. 4 may no longer be the desired position. The armrest 16 can be rotated to the desired position, such as is designated by $X_4$ of FIG. 4, in a manner similar to the positioning operation from $X_1$ to $X_2$ as described above.

It should be understood that further modifications and variations may be made in the present invention without departing from the spirit and scope of the present invention as set forth in the appended claims. For example, a lock plate having slots may be attached to a seat back side bracket, and a lock plate having tabs may be connected to an armrest so that the tabs can engage the slots to lock the armrest to the side bracket.

What is claimed is:

1. A seat having a seat cushion and a seat back, the seat back being changeable in angular position with respect to the seat cushion, the seat comprising:
   (a) a side bracket secured to the seat back and having at least one hole extending therethrough;
   (b) an armrest pivotally connected to the side bracket and thereby being variable in angular position with respect to the seat back, the armrest having a set of holes spaced in a direction of angular movement of the armrest; and
   (c) at least one tab movably extending through the hole of the side bracket and thereby engaging the side bracket, the tab being selectively movable between a locking position in which part of the tab is positioned in any one of the holes of the armrest and an unlocking position in which the tab is positioned out of the holes of the armrest, the tab being thereby in and out of engagement with the armrest when the tab assumes the locking and unlocking positions respectively, whereby the armrest can be fastened to and released form the seat back when the tab assumes the locking and unlocking positions respectively, the tab being operative to selectably fix the armrest in any one of a plurality of preset angular positions with respect to the seat back which correspond to positions of the holes of the armrest respectively, whereby a change of the hole of the armrest in which the part of the tab is positioned causes a change of the preset angular positions in which the armrest is fixed.

2. A seat as recited in claim 1, wherein the preset angular positions of the armrest include a retracted position where the armrest is adjacent and parallel to one side of the seat back.

3. A seat as recited in claim 1, further comprising a sleeve extending through the armrest and secured to the side bracket, the armrest being rotatable about the sleeve.

4. A seat as recited in claim 3, further comprising a lock plate, a spring, and a shaft, the lock plate being fixed to the tab, the spring urging the lock plate and the tab toward the armrest, the shaft being fixed to the lock plate and slideably extending through the sleeve, whereby the tab can be displaced from the holes of the armrest by shifting the shaft to move the lock plate against the force of the spring.

5. A seat as recited in claim 4, wherein the armrest has a stopper being engageable with the tab so as to be able to stop the rotation of the armrest.

6. A seat as recited in claim 4, wherein the shaft has a button at the end so as to be easily shifted by pushing the button.

* * * * *